(12) United States Patent
Ichinose

(10) Patent No.: US 7,865,706 B2
(45) Date of Patent: Jan. 4, 2011

(54) INFORMATION PROCESSING METHOD AND INSTRUCTION GENERATING METHOD

(75) Inventor: Naoya Ichinose, Osaka (JP)

(73) Assignee: Panasonic Corporation, Osaka (JP)

( * ) Notice: Subject to any disclaimer, the term of this patent is extended or adjusted under 35 U.S.C. 154(b) by 476 days.

(21) Appl. No.: 11/797,685

(22) Filed: May 7, 2007

(65) Prior Publication Data

US 2007/0266230 A1 Nov. 15, 2007

(30) Foreign Application Priority Data

May 12, 2006 (JP) ............................... 2006-133471

(51) Int. Cl.
*G06F 15/00* (2006.01)
(52) U.S. Cl. ..................................... 712/244
(58) Field of Classification Search ........................ None
See application file for complete search history.

(56) References Cited

U.S. PATENT DOCUMENTS

| | | | |
|---|---|---|---|
| 3,781,810 A * | 12/1973 | Downing | ..................... 712/228 |
| 5,727,217 A | 3/1998 | Young | |
| 5,956,511 A | 9/1999 | Tahara | |
| 6,061,777 A * | 5/2000 | Cheong et al. | ................. 712/23 |
| 6,205,467 B1 * | 3/2001 | Lambrecht et al. | .......... 718/108 |
| 6,205,543 B1 * | 3/2001 | Tremblay et al. | ............ 712/228 |
| 6,961,930 B1 | 11/2005 | Waldspurger et al. | |

FOREIGN PATENT DOCUMENTS

| | | |
|---|---|---|
| JP | 07-073049 | 3/1995 |
| JP | 2002-140199 | 5/2002 |

OTHER PUBLICATIONS

Japanese Office Action issued in Japanese Patent Application No. JP 2006-133471 fated Aug. 31, 2010.

* cited by examiner

*Primary Examiner*—Eddie P Chan
*Assistant Examiner*—John Lindlof
(74) *Attorney, Agent, or Firm*—McDermott Will & Emery LLP

(57) ABSTRACT

According to a generated instruction, the present invention provides an information processing method for performing processing by using a CPU that comprises at least one register. The method comprises the steps of: judging whether or not each of the registers is valid in the instruction; identifying a register whose value is changed by an interrupt processing generated in the instruction; and calculating a number of registers to be evacuated in the interrupt processing based on valid judgment information of the register and identification information of the register whose value is changed by the interrupt processing, and determining whether or not the interrupt processing is permitted based on a calculation result thereof.

6 Claims, 8 Drawing Sheets

FIG. 2

1 Source file

```
_INT_START:

_int_handler1:
        mov    0x40000010,a3
        mov    (a3), d0
        add    0x10, d0
        mov    d0, (a3)
        rti

_INT_END:

func1:
        |
        |
        add    d0, d2
        mov    (mem),d1
        mov    d2, (a3)
        add    d0, d2, d3
        mov    0x40000000,a0
        mov    0x40000008,a1
        inc4   a3
        clr    d0
        nop
        |

_INT_START:

_int_handler2:
        mov    0x40000020,a0
        mov    (a0), a1
        add    0x10, a1
        mov    a1, (a0)
        rti

_INT_END:
```

F I G. 3
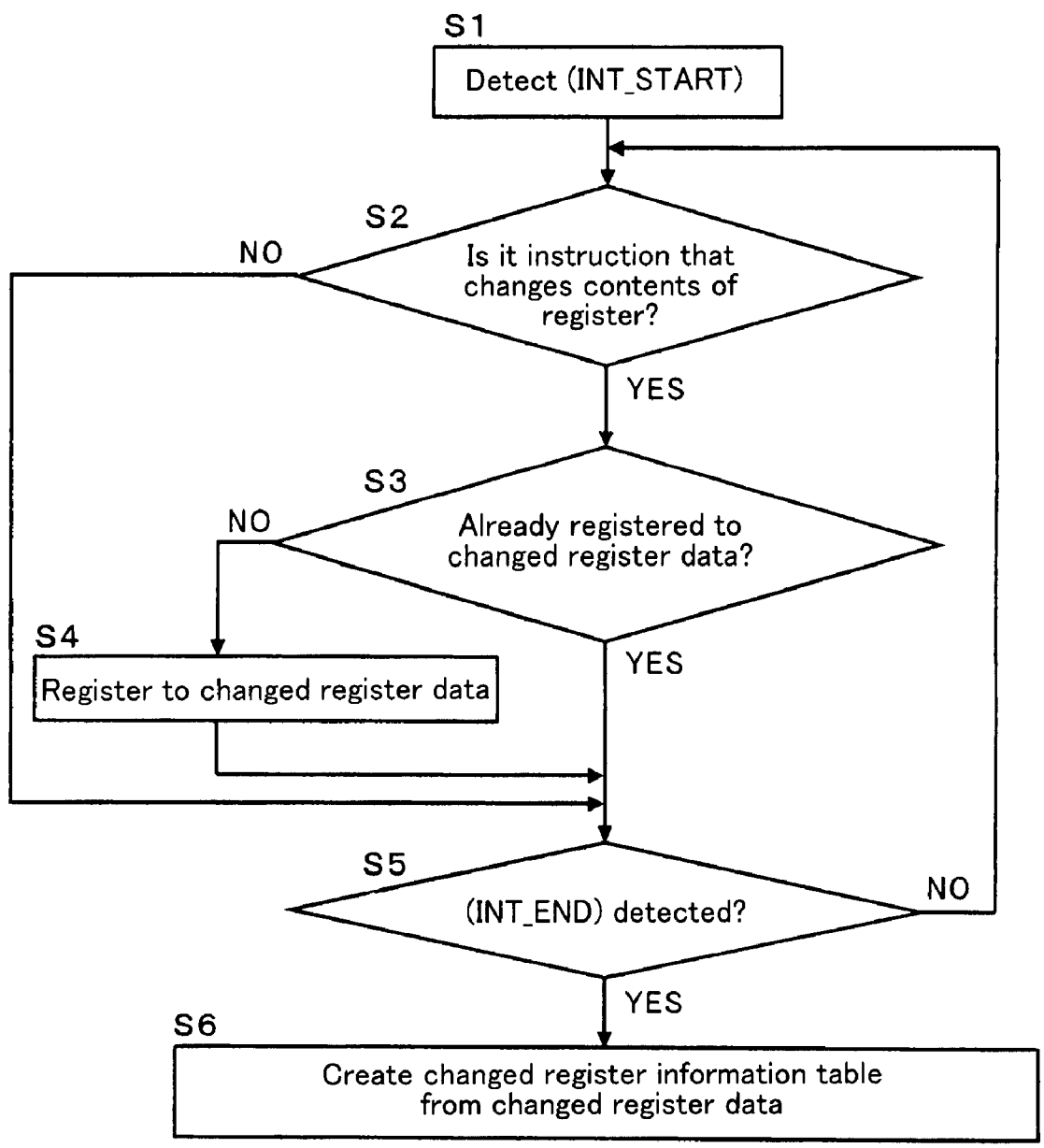

FIG. 4

Valid register information table 4

| Instruction sequence | Register name [ 1:Valid  0: Invalid ] | | | | | | | |
|---|---|---|---|---|---|---|---|---|
| | D0 | D1 | D2 | D3 | A0 | A1 | A2 | A3 |
| mov  0x40000010,a3 | 0 | 0 | 0 | 0 | 0 | 0 | 0 | 0 |
| mov  (a3), d0 | 0 | 0 | 0 | 0 | 0 | 0 | 0 | 1 |
| add  0x10, d0 | 1 | 0 | 0 | 0 | 0 | 0 | 0 | 1 |
| mov  d0, (a3) | 1 | 0 | 0 | 0 | 0 | 0 | 0 | 1 |
| rti | 0 | 0 | 0 | 0 | 0 | 0 | 0 | 0 |
| | | | | | | | | |
| add  d0, d2 | 1 | 0 | 0 | 0 | 0 | 0 | 1 | 1 |
| mov  (mem), d1 | 1 | 0 | 1 | 0 | 0 | 0 | 1 | 1 |
| mov  d2, (a3) | 1 | 1 | 1 | 0 | 0 | 0 | 1 | 1 |
| add  d0, d2, d3 | 1 | 1 | 1 | 0 | 0 | 0 | 1 | 0 |
| mov  0x40000000, a0 | 0 | 1 | 1 | 1 | 0 | 0 | 1 | 0 |
| mov  0x40000008, a1 | 0 | 1 | 1 | 1 | 1 | 0 | 1 | 0 |
| inc4  a3 | 0 | 1 | 1 | 1 | 1 | 1 | 1 | 0 |
| clr  d0 | 0 | 1 | 1 | 1 | 1 | 1 | 1 | 1 |
| nop | 1 | 1 | 1 | 1 | 1 | 1 | 1 | 1 |
| | | | | | | | | |
| mov  0x40000020,a0 | 0 | 0 | 0 | 0 | 0 | 0 | 0 | 0 |
| mov  (a0), a1 | 0 | 0 | 0 | 0 | 1 | 0 | 0 | 0 |
| add  0x10, a1 | 0 | 0 | 0 | 0 | 1 | 1 | 0 | 0 |
| mov  a1, (a0) | 0 | 0 | 0 | 0 | 1 | 1 | 0 | 0 |
| rti | 0 | 0 | 0 | 0 | 0 | 0 | 0 | 0 |

FIG. 5

Changed register information table 5

| Interrupt processing | Register name [ 1:Valid  0: Invalid ] | | | | | | | |
|---|---|---|---|---|---|---|---|---|
| | D0 | D1 | D2 | D3 | A0 | A1 | A2 | A3 |
| Interrupt processing | 1 | 0 | 0 | 0 | 1 | 1 | 0 | 1 |

FIG. 6

| Instruction sequence | Register name [ 1:Valid  0: Invalid ] | | | | | | | |
|---|---|---|---|---|---|---|---|---|
| | D0 | D1 | D2 | D3 | A0 | A1 | A2 | A3 |
| mov  0x40000010,a3 | 0 | 0 | 0 | 0 | 0 | 0 | 0 | 0 |
| mov  (a3), d0 | 0 | 0 | 0 | 0 | 0 | 0 | 0 | 1 |
| add  0x10, d0 | 1 | 0 | 0 | 0 | 0 | 0 | 0 | 1 |
| mov  d0, (a3) | 1 | 0 | 0 | 0 | 0 | 0 | 0 | 1 |
| rti | 0 | 0 | 0 | 0 | 0 | 0 | 0 | 0 |
| | | | | | | | | |
| add  d0, d2 | 1 | 0 | 0 | 0 | 0 | 0 | 0 | 1 |
| mov  (mem), d1 | 1 | 0 | 0 | 0 | 0 | 0 | 0 | 1 |
| mov  d2, (a3) | 1 | 0 | 0 | 0 | 0 | 0 | 0 | 1 |
| add  d0, d2, d3 | 1 | 0 | 0 | 0 | 0 | 0 | 0 | 0 |
| mov  0x40000000, a0 | 0 | 0 | 0 | 0 | 0 | 0 | 0 | 0 |
| mov  0x40000008, a1 | 0 | 0 | 0 | 0 | 1 | 0 | 0 | 0 |
| inc4  a3 | 0 | 0 | 0 | 0 | 1 | 1 | 0 | 0 |
| clr  d0 | 0 | 0 | 0 | 0 | 1 | 1 | 0 | 1 |
| nop | 1 | 0 | 0 | 0 | 1 | 1 | 0 | 1 |
| | | | | | | | | |
| mov  0x40000020,a0 | 0 | 0 | 0 | 0 | 0 | 0 | 0 | 0 |
| mov  (a0), d0 | 0 | 0 | 0 | 0 | 1 | 0 | 0 | 0 |
| add  0x10, d0 | 0 | 0 | 0 | 0 | 1 | 1 | 0 | 0 |
| mov  d0, (a0) | 0 | 0 | 0 | 0 | 1 | 1 | 0 | 0 |
| rti | 0 | 0 | 0 | 0 | 0 | 0 | 0 | 0 |

FIG. 7

```
                                1  Source file

_INT_START_1:

_int_handler1:
        mov     0x40000010,a3
        mov     (a3), d0
        add     0x10, d0
        mov     d0, (a3)
        rti

_INT_END_1:

func1:
            |
            |
        add     d0, d2
        mov     (mem),d1
        mov     d2, (a3)
        add     d0, d2, d3
        mov     0x40000000,a0
        mov     0x40000008,a1
        inc4    a3
        clr     d0
        nop
            |

_INT_START_2:

_int_handler2:
        mov     0x40000020,a0
        mov     (a0), a1
        add     0x10, a1
        mov     a1, (a0)
        rti

_INT_END_2:
```

FIG. 9

| Interrupt processing | Instruction sequence | Register name [ 1:Valid  0: Invalid ] | | | | | | | |
|---|---|---|---|---|---|---|---|---|---|
| | | D0 | D1 | D2 | D3 | A0 | A1 | A2 | A3 |
| int_handler1 | mov 0x40000010,a3 | 0 | 0 | 0 | 0 | 0 | 0 | 0 | 0 |
| | mov (a3), d0 | 0 | 0 | 0 | 0 | 0 | 0 | 0 | 1 |
| | add 0x10, d0 | 1 | 0 | 0 | 0 | 0 | 0 | 0 | 1 |
| | mov d0, (a3) | 1 | 0 | 0 | 0 | 0 | 0 | 0 | 1 |
| | rti | 0 | 0 | 0 | 0 | 0 | 0 | 0 | 0 |
| | | | | | | | | | |
| | add d0, d2 | 1 | 0 | 0 | 0 | 0 | 0 | 0 | 1 |
| | mov (mem), d1 | 1 | 0 | 0 | 0 | 0 | 0 | 0 | 1 |
| | mov d2, (a3) | 1 | 0 | 0 | 0 | 0 | 0 | 0 | 1 |
| | add d0, d2, d3 | 1 | 0 | 0 | 0 | 0 | 0 | 0 | 0 |
| | mov 0x40000000, a0 | 0 | 0 | 0 | 0 | 0 | 0 | 0 | 0 |
| | mov 0x40000008, a1 | 0 | 0 | 0 | 0 | 0 | 0 | 0 | 0 |
| | inc4 a3 | 0 | 0 | 0 | 0 | 0 | 0 | 0 | 0 |
| | clr d0 | 0 | 0 | 0 | 0 | 0 | 0 | 0 | 1 |
| | nop | 1 | 0 | 0 | 0 | 0 | 0 | 0 | 1 |
| | | | | | | | | | |
| | mov 0x40000020,a0 | 0 | 0 | 0 | 0 | 0 | 0 | 0 | 0 |
| | mov (a0), d0 | 0 | 0 | 0 | 0 | 0 | 0 | 0 | 0 |
| | add 0x10, d0 | 0 | 0 | 0 | 0 | 0 | 0 | 0 | 0 |
| | mov d0, (a0) | 0 | 0 | 0 | 0 | 0 | 0 | 0 | 0 |
| | rti | 0 | 0 | 0 | 0 | 0 | 0 | 0 | 0 |
| int_handler2 | mov 0x40000010,a3 | 0 | 0 | 0 | 0 | 0 | 0 | 0 | 0 |
| | mov (a3), d0 | 0 | 0 | 0 | 0 | 0 | 0 | 0 | 0 |
| | add 0x10, d0 | 0 | 0 | 0 | 0 | 0 | 0 | 0 | 0 |
| | mov d0, (a3) | 0 | 0 | 0 | 0 | 0 | 0 | 0 | 0 |
| | rti | 0 | 0 | 0 | 0 | 0 | 0 | 0 | 0 |
| | | | | | | | | | |
| | add d0, d2 | 0 | 0 | 0 | 0 | 0 | 0 | 0 | 0 |
| | mov (mem), d1 | 0 | 0 | 0 | 0 | 0 | 0 | 0 | 0 |
| | mov d2, (a3) | 0 | 0 | 0 | 0 | 0 | 0 | 0 | 0 |
| | add d0, d2, d3 | 0 | 0 | 0 | 0 | 0 | 0 | 0 | 0 |
| | mov 0x40000000, a0 | 0 | 0 | 0 | 0 | 0 | 0 | 0 | 0 |
| | mov 0x40000008, a1 | 0 | 0 | 0 | 0 | 1 | 0 | 0 | 0 |
| | inc4 a3 | 0 | 0 | 0 | 0 | 1 | 1 | 0 | 0 |
| | clr d0 | 0 | 0 | 0 | 0 | 1 | 1 | 0 | 0 |
| | nop | 0 | 0 | 0 | 0 | 1 | 1 | 0 | 0 |
| | | | | | | | | | |
| | mov 0x40000020,a0 | 0 | 0 | 0 | 0 | 0 | 0 | 0 | 0 |
| | mov (a0), d0 | 0 | 0 | 0 | 0 | 1 | 0 | 0 | 0 |
| | add 0x10, d0 | 0 | 0 | 0 | 0 | 1 | 1 | 0 | 0 |
| | mov d0, (a0) | 0 | 0 | 0 | 0 | 1 | 1 | 0 | 0 |
| | rti | 0 | 0 | 0 | 0 | 0 | 0 | 0 | 0 |

INFORMATION PROCESSING METHOD AND INSTRUCTION GENERATING METHOD

BACKGROUND OF THE INVENTION

1. Field of the Invention

The present invention relates to an information processing method for performing processing by using a CPU (Central Processing Unit) that comprises one and more register. More specifically, the present invention relates to a technique for enabling effective evacuation of the registers at the time of interruption.

2. Description of the Related Art

An interruption technique in the recent information processing method is used for various purposes in order to perform real-time response to the events such as a request from an input/output device and interval timer interruption.

As the basic interruption control performed in a CPU, there are a mode for accepting the interruption and a mode for not accepting the interruption. It is also possible to reject interruption (by each interruption) with the use of a masked bit that is set in advance on a state register, even if it is in the mode for accepting the interruption. Further, when the CPU selects either the mode for accepting the interruption or the mode for inhibiting the interruption, the control is carried out via writing in the state register. Therefore, when there is an interruption request during the execution of a certain process, an interruption is generated selectively on condition that the process is in a mode capable of accepting the interruption and an interruption request signal is not being masked. When an interruption is generated, the generated interruption is usually branched to proper interruption handlers. At this time, if the resources such as the register and the state register used in the user program are destroyed during the processing performed within the interruption handlers, it is not possible to restart the normal execution of the original user program after return from the interruption handlers. Therefore, when an interruption is generated, it is essential to evacuate the resources. However, practically, the entire resources containing the invalid resource are evacuated every time when accepting the interruption, since it is not possible to discriminate whether resources are valid or invalid.

A conventional technique disclosed in Japanese Published Patent Literature (Japanese Unexamined Patent Publication 2002-140199) provides a device to an instruction generating apparatus for judging whether the registers of the CPU are valid or not in order to selectively evacuate the contents of the valid register so as to reduce unnecessary evacuation of the register. Further, evacuation of the register is reduced through accepting the interruption only at the position where the number of valid registers is the least, so as to perform the interrupt processing at a much higher speed.

However, even in the case where only the valid registers are evacuated, it is not practically necessary to evacuate the register whose value does not change by the interrupt processing. Nonetheless, in the conventional technique, evacuation and return processing is carried out also on the register that is not necessary to be evacuated. As a result, it causes deterioration in the efficiency of the interrupt processing along with an increase in the memory capacity that is caused due to an increase in the amount of stack consumption.

SUMMARY OF THE INVENTION

The main object of the present invention therefore is to provide an information processing method that decreases the memory capacity to be used by suppressing evacuation of the registers to the stack to be the minimum in the interrupt processing, and enhances the system performance by improving the overhead by the evacuation of the registers.

The information processing method of the present invention is an information processing method for performing processing according to a generated instruction by using a CPU that comprises at least one register. The method comprises the steps of:

judging whether or not each of the registers in the instruction is valid;

identifying a register whose value is changed by interrupt processing generated in the instruction; and calculating the number of registers to be evacuated in the interrupt processing based on valid judgment information of the register and identification information of the register whose value is changed by the interrupt processing, and determining whether or not the interrupt processing is permissible or inadmissible based on a calculation result thereof.

In this information processing method, the position where there is less number of registers to be evacuated (preferably, the position where no register is evacuated) is determined based on two types of information, i.e. the information indicating that the register is valid and the information of the register whose value is changed by the interrupt processing. Then, the interrupt processing at that position is permitted based thereupon. When the register is valid and it is the register whose value is to be changed, that register is necessary to be evacuated. In the meantime, the invalid register is unnecessary to be evacuated. In addition, it is unnecessary to evacuate the register, when it is the register whose value is not changed even if it is valid. In the case where the register where the information indicating that the register is valid is consistent with the information of the register whose value is changed by the interrupt processing, it is necessary to judge right and wrong of the inserting position of the evacuation/return instruction. On the contrary, in the register where the information indicating that the register is valid is not consistent with the information of the register whose value is changed by the interrupt processing, it is less necessary to judge right and wrong of the inserting position of the evacuation/return instruction. Accordingly, at only the position where there is no register where the two types of information are consistent (the position where the results of logic products of both types of information are all 0), all the interrupt processing can be permitted. The position where there is less number of registers where the two types of information are consistent may be taken as the position for permitting the interrupt processing. Herewith, it is possible to achieve much faster interrupt processing.

In the above-described information processing method, there is such an embodiment that, with respect to each position where the interrupt processing is generated, it is judged whether or not there is no such register that is judged as valid and no such register whose value is changed in a group of registers except for a single or a plurality of specific registers that are set in advance in an interrupt processing group obtained by forming each of the interrupt processing into a group; and all the interrupt processing at the position judged to be no such registers is permitted. In this embodiment, it is preferable to perform evacuation and return operations only in the specific register in each interrupt processing.

This is the embodiment where judgment of permitting the interruption is performed separately on the specific registers and the other registers. The evacuation/return instruction is applied to the specific registers, however, it is halted for the other registers. This makes it possible to avoid the deterioration in the performance caused due to performing evacuation to the number of the unnecessary registers at the time of interrupt processing. As a result, the amount of stack consumption can be reduced and the capacity of the memory to be used can be decreased. Therefore, optimization of the interrupt processing can be expected in accordance with the condition of the CPU.

Further, in the above-described information processing method, there is such an embodiment that, with respect to each position where the interrupt processing is generated, it is judged whether or not there is no such register that is judged as valid and no such register whose value is changed in an interrupt processing group obtained by forming each of the interrupt processing into a group; and all the interrupt processing at the position judged to be no such registers is permitted. In this embodiment, it is preferable to halt the evacuation/return of the register in each interrupt processing.

This is the embodiment where judgment of permitting the interruption is performed equally on all the registers, unlike the above-described case where it is performed separately on the specific registers and other registers. At the position where there is no register where the two types of information are consistent (the position where the results of logic products of both types of information are all 0), it is unnecessary to judge right and wrong of the inserting position of the evacuation/return instruction. Thus, all the interrupt processing can be permitted.

Furthermore, in the above-described information processing method, there is such an embodiment that, with respect to each interrupt processing, it is judged whether or not there is no such register that is judged as valid and no such register where the value is changed in a group of registers except for a single or a plurality of specific registers that are set in advance; and the interrupt processing that is judged to be no such registers is permitted. In this embodiment, it is preferable to evacuate the specific register selectively in executing the permitted interrupt processing, and to return the specific register in ending the interrupt processing.

This is the embodiment where each of the interrupt processing is managed individually, instead of collectively managing all the interrupt processing by forming each of the processing into a group. In this embodiment, judgment of permitting the interruption is performed separately on the specific registers and other registers.

Moreover, in the above-described information processing method, there is such a form that, with respect to each interrupt processing, it is judged whether or not there is no such register that is judged as valid and no such register where the value is changed; and the interrupt processing that is judged to be no such register is permitted. In this embodiment, it is preferable to halt the evacuation/return of the register in each interrupt processing.

This is the embodiment where each of the interrupt processing is managed individually, instead of collectively managing all the interrupt processing by forming every processing into a group. In this embodiment, judgment of permitting the interruption is performed equally on all the registers without separating the specific registers and other registers.

Further, it is also technically effective to employ an instruction generating method where it is judged whether or not the interruption is permitted by the above-described information processing method, and thereafter an interrupt permitting instruction is selectively inserted only at a position where interrupt processing is permitted.

In the present invention, interruption is permitted, for example, only at the position where there is no register to be evacuated through using the information indicating whether or not the registers is valid, and the information of the register whose value is changed in the interrupt processing. Herewith, it becomes possible in the present invention to avoid evacuation of the registers to the stack in the interrupt processing. As a result, the amount of stack consumption can be reduced and the capacity of the memory to be used can be decreased. Further, by avoiding the evacuation of the registers, much faster interrupt processing can be achieved.

The information processing method according to the present invention is capable of reducing the amount of stack consumption, for example, through avoiding the evacuation of the registers in the interrupt processing in the system to which the CPU that comprises the registers is loaded. Herewith, the memory used therein can be reduced. This leads to a cut in the cost of the set particularly in a memory saving mounting type system of a microcomputer for use of mounting. Further, by avoiding the evacuation of the registers, interrupt processing can be performed at a much faster speed. Therefore, the present invention is effective particularly for the system that requires the real-time operation.

BRIEF DESCRIPTION OF THE DRAWINGS

Other objects of the present invention will become clear from the following description of the preferred embodiments and the appended claims. Those skilled in the art will appreciate that there are many other advantages of the present invention by embodying the present invention.

FIG. 2 is an illustration schematically showing contents of the source file of FIG. 1 according to the first embodiment of the present invention with machine language instruction sequence;

FIG. 3 is a flowchart showing the procedure for judging information of the register changed by a compiler shown in FIG. 1;

FIG. 4 is an illustration showing information table on a valid register of the machine language instruction sequence shown in FIG. 2;

FIG. 5 is an illustration showing a changed register information table obtained as a result of the judging procedure of FIG. 3, according to the first embodiment of the present invention;

FIG. 6 is an illustration showing the result of logic products applied to the valid register information table of FIG. 4 and the result shown in FIG. 5, according to the first embodiment of the present invention;

FIG. 7 is an illustration schematically showing contents of the source file of FIG. 1 according to the second embodiment of the present invention with machine language instruction sequence;

FIG. 9 is an illustration showing the result of logic products applied to the valid register information table of FIG. 4 and the result shown in FIG. 8, according to the second embodiment of the present invention

DETAILED DESCRIPTION OF THE INVENTION

Figure 1:
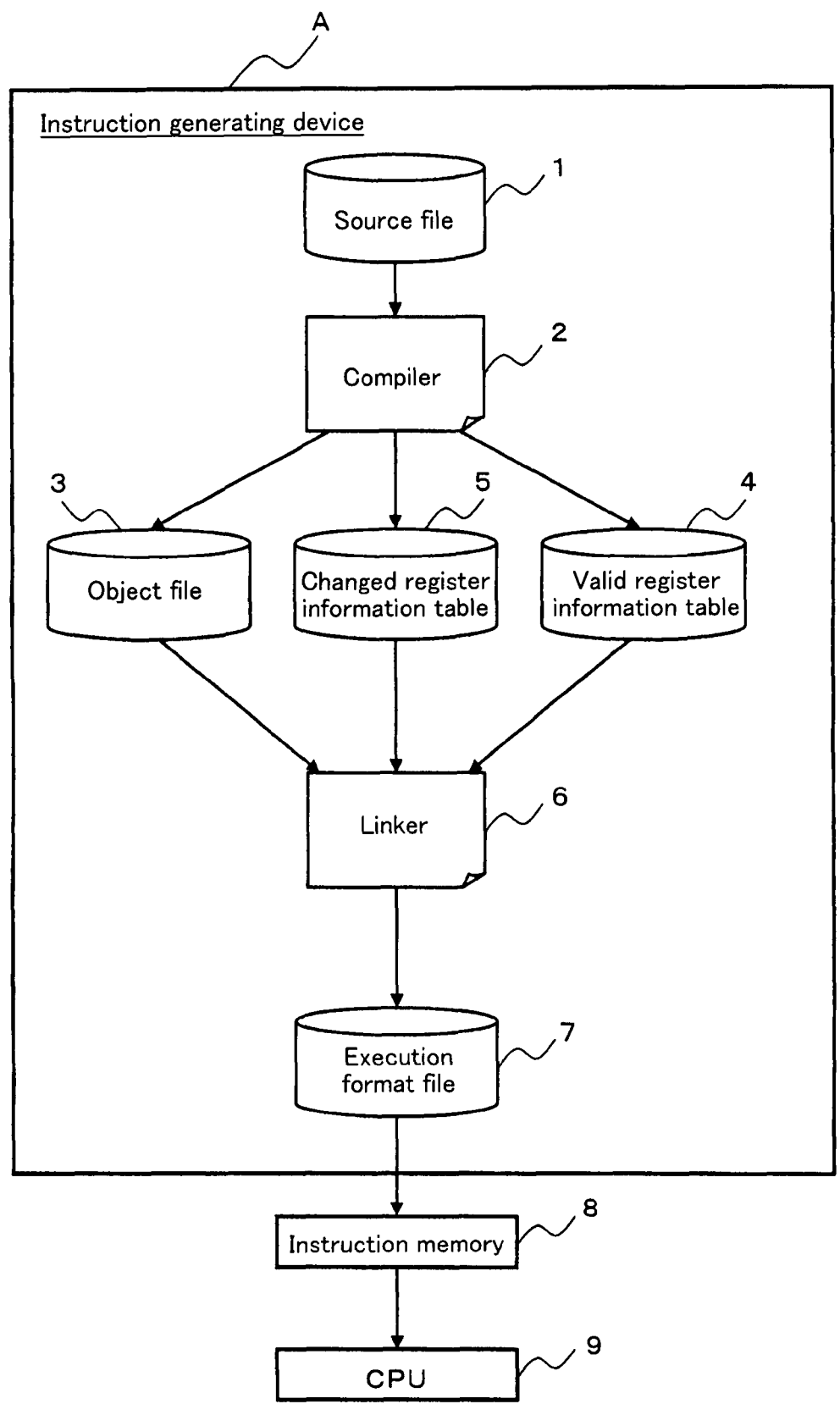
FIG. 1 is an illustration showing the schematic structure of an information processing apparatus according to a first embodiment of the present invention.

Hereinafter, embodiments of the information processing method according to the present invention will be described in detail referring to the accompanying drawings. FIG. 1 illustrates the information processing method according to an embodiment of the present invention. In FIG. 1, "A" is an instruction generating device. The instruction generating device A comprises a compiler 2, an object file 3, a changed register information table 4, a valid register information table 5, a linker 6, and an execution format file 7.

The compiler 2 translates a source file 1 that is written by a user. The object file 3 is generated when the complier 2 performs compile processing. The changed register information table 4 is formed through collecting the registers whose values are changed by the interrupt processing that is generated by the compiler 2. The valid register table 5 shows the one collected whether the registers are valid or not. The linker 6 links to the object file 3. The execution format file 7 is generated with the linker 6. The execution format file 7 is loaded on an instruction memory 8, and executed by a CPU 9. For the devices other than the instruction generating device A, the typical structures are employed.

First Embodiment

FIG. 2 is an illustration schematically showing the contents of the source file 1 according to the first embodiment. Here, the meanings of the machine language instructions shown in FIG. 2 are as follows.

ADD OP1, OP2: Transfer the contents of OP1+OP2 to OP2

ADD OP1, OP2, OP3: Transfer the contents of OP1+OP2 to OP3

CLR: OP Clear the contents of OP to "0"

MOV OP1, OP2: Transfer the contents of OP1 to OP2

MOV OP, (addr): Transfer the contents of OP to the address indicated by addr

INC4 OP: Increments the contents of OP by 4

NOP: No operation

RTI: Return from interruption program

In FIG. 2, the start and the end of the interrupt processing are specified by (_INT_START) and (_INT_END) respectively. In the case of using a method where the interrupt processing and non-interrupt processing can be discriminated, the start and the end of the interrupt processing may be specified by other methods.

The compiler 2 judges the valid register of every instruction (existing technique) from the machine language instruction sequence shown in FIG. 2. As the result of the judgments on the valid registers of each instruction, the compiler 2 generates the valid register information table 5 shown in FIG. 4. In FIG. 4, the CPU 9 comprises the registers D0, D1, D2, D3, A0, A1, A2, A3, and "1" in the table indicates that the register is valid and "0" indicates that the register is invalid.

For the machine language instruction sequence of FIG. 2, the compiler 2 judges the registers whose values are possible to be changed during the period from (_INT_START) to (_INT_END). FIG. 3 shows an example of the judging procedure thereof.

First, in FIG. 3, when (_INT_START) is detected (S1), the next instruction is judged whether or not it is an instruction by which the value of the register is changed with respect to each instruction (S2). When it is judged as the instruction by which the value is changed, there is performed judgment on the register whose value is to be changed so as to find whether or not that register has already been registered to the changed register data (S3). When it is judged that it is not registered, the register is registered to the changed register data (S4). The processing described above is repeated until detecting (_INT_END).

As a result of performing the above-described operations to the machine language instruction sequence of FIG. 2, the compiler 2 generates the changed register information table 4 that is shown in FIG. 5 from the changed register data. In FIG. 5, the CPU 9 comprises the registers D0, D1, D2, D3, A0, A1, A2, A3, and "1" in the table indicates that the register value is changed and "0" indicates that the register value is not changed.

The compiler 2 gives the changed register information table 4 and the valid register information table 5 along with the object file 3 to the linker 6. Based on the changed register information table 4 and the valid register information table 5, the linker 6 determines the position (the position in the instruction sequence) for arranging an interrupt permitting instruction (INT_PERMIT), i.e. existing technique in the instruction sequence in the following manner. The interrupt permitting instruction means an instruction where a control for permitting the interruption is carried out only when this instruction is decoded.

The linker 6 calculates the logic products with respect to each register from the values obtained from the changed register information table 4 shown in FIG. 5 and the values obtained from the valid register information table 5 shown in FIG. 4. FIG. 6 shows the results of calculations. In FIG. 6, the position where all the values become "0" is selected, and the interrupt permitting instruction (INT_PERMIT) is inserted to the position just before the selected instruction. At this time, it is not necessary to insert evacuation/return processing of the register in each interrupt processing.

Furthermore, in FIG. 6, the linker 6 may select the position where the values of the registers, for example, other than D0 and A3 become all "0", and insert the interrupt permitting instruction (INT_PERMIT) to the position just before the selected instruction. In this case, the evacuation/return instruction for the registers D0, A3 is inserted in each interrupt processing. However, it is not necessary to insert the evacuation/return instruction for other registers.

In the first embodiment, all the interrupt processing is formed into a group so as to manage collectively. However, it is possible to control with respect to each interrupt processing individually. Such method will be described in a second embodiment.

Second Embodiment

FIG. 7 is an illustration schematically showing the contents of the source file 1 shown in FIG. 1 according to the second embodiment. First, in creating the source file, the start and the end of the interrupt processing are clearly specified with (_INT_START_[INT_NO]) and (_INT_END_[INT_NO]) respectively, by each processing. [INT_NO] indicates the interruption number, and the interruption number corresponding to the respective interrupt processing is applied to each processing.

The compiler 2 judges the valid registers by each instruction, and it is an existing technique. The compiler 2 creates the valid register information table 5 that is shown in FIG. 4, based on the judgments of the valid registers performed by each instruction. In FIG. 4, the CPU 9 comprises the registers D0, D1, D2, D3, A0, A1, A2, A3, and "1" in the table indicates that the register is valid and "0" indicates that the register is invalid.

In compiling the source file, the compiler 2 judges the registers whose values are possible to be changed during the period from (_INT_START_[INT_NO]) to (_INT_END [INT_NO]). At this time, the registers whose values are possible to be changed are judged separately with respect to each interruption number. The structure required for this judgment is the same as that of the first embodiment shown in FIG. 3.

Figure 8:
FIG. 8 is an illustration showing a changed register information table obtained as a result of the judging procedure of FIG. 3, according to a second embodiment of the present invention.

As a result of performing the above-described operations to the machine language instruction sequence of FIG. 7, the compiler 2 generates the changed register information table 4 that is shown in FIG. 8 from the changed register data. In FIG. 8, the CPU 9 comprises the registers D0, D1, D2, D3, A0, A1, A2, A3, and "1" in the table indicates that the register value is changed and "0" indicates that the register value is not changed.

The compiler 2 gives the changed register information table 4 and the valid register information table 5 along with the object file 3 to the linker 6. Based on the changed register information table 4 and the valid register information table 5, the linker 6 determines the position for arranging an interrupt permitting instruction in the following manner. The interrupt permitting instruction means an instruction with which a control for permitting the interruption is carried out only when this instruction is decoded.

The linker 6 calculates the logic products with respect to each register from the values obtained from the changed register information table 4 shown in FIG. 8 and the values obtained from the valid register information table 5 shown in FIG. 4. FIG. 9 shows the results of calculations. In FIG. 9, the position where all the values become "0" is selected with respect to each interruption number, and the interrupt permitting instruction (INT_PERMIT_[INT_NO]) is inserted to the position just before the selected instruction. (INT_PERMIT_[INT_NO]) is an instruction that permits the interruption by specifying the interrupt processing to be permitted from the interruption number indicated in [INT_NO]. At this time, it is not necessary to insert evacuation/return processing of the register in each interrupt processing.

Besides, in FIG. 9, with respect to each interrupt processing, the linker 6 may select the position where the values of the registers other than D0, for example, for int_handler1 become all "0", and select the position where the values of the registers other than A0 for int_handler2 become all "0". Then, the interrupt permitting instruction (INT_PERMIT_[INT_NO]) may be inserted to the position just before the selected instruction. In this case, in each interrupt processing, the evacuation/return instruction of the register D0 is inserted for int_handler1, and the evacuation/return instruction of the registers A3 is inserted for int_handler2. However, it is not necessary to insert the evacuation/return instruction of other registers.

The present invention has been described in detail referring to the most preferred embodiments. However, various combinations and modifications of the components are possible without departing from the spirit and the broad scope of the appended claims.

What is claimed is:

1. A method of generating instructions comprising a plurality of instructions of non-interrupt processing and an instruction of interrupt processing, to be executed by a CPU which includes a plurality of registers, the method comprising:
   a first step for judging whether or not each of the plurality of registers is valid for each of the plurality instructions of non-interrupt processing;
   a second step for judging whether or not a value of each of the plurality of registers is changed by the instruction of interrupt processing; and
   a third step for inserting an interrupt permitting instruction, which permits the CPU to carry out the instruction of interrupt processing, just before a selected instruction included in the plurality of instructions of non-interrupt processing, wherein:
   in the third step, the interrupt permitting instruction is inserted when it is judged that each of the plurality of registers is valid in the first step and the value of each of the plurality of registers is not changed in the second step, and
   the third step is performed so that a number of specific registers, which are valid for one of the plurality of instructions of non-interrupt processing and each of whose value is changed by the instruction of interrupt processing, becomes minimum for the selected instruction among the plurality of instructions of non-interrupt processing.

2. The method of generating instructions of claim 1, wherein the number of the specific registers is zero.

3. An information processing method for performing processing according to the instructions generated by the method of claim 1, wherein:
   values of only the specific registers are saved by the CPU while the instruction of interrupt processing is executed, and
   the values are restored to the specific registers after executing the instruction of interrupt processing.

4. A method of generating instructions comprising a plurality of instructions of non-interrupt processing and a plurality of instructions of interrupt processing, to be executed by a CPU which includes a plurality of registers, the method comprising:
   a first step for judging whether or not each of the plurality of registers is valid for each of the plurality of instruction of non-interrupt processing;
   a second step for judging whether or not a value of each of the plurality of registers is changed by the plurality of instructions of interrupt processing; and
   a third step for inserting an interrupt permitting instruction, which permits the CPU to carry out at least one of the plurality of instructions of interrupt processing, just before a selected instruction included in the plurality of instructions of non-interrupt processing, wherein:
   in the third step, the interrupt permitting instruction is inserted when it is judged that each of the plurality of registers is valid in the first step and the value of each of the plurality of registers is not changed in the second step, and
   the third step is performed so that a number of specific registers, which are valid for one of the plurality of instructions of non-interrupt processing and each of whose value is changed by the at least one of the plurality of instructions of interrupt processing, becomes minimum for the selected instruction among the plurality of instructions of non-interrupt processing.

5. The method of generating instructions of claim 4, wherein the number of the specific registers is zero.

6. An information processing method for performing processing according to the instructions generated by the method of claim 4, wherein:
   values of only the specific registers are saved by the CPU while the at least one of the plurality of instructions of interrupt processing is executed, and
   the values are restored to the specific registers after executing the at least one of the plurality of instructions of interrupt processing.

* * * * *